United States Patent [19]
Fried

[11] Patent Number: 4,792,231
[45] Date of Patent: Dec. 20, 1988

[54] LASER SPECKLE IMAGING

[76] Inventor: David L. Fried, 325 Liberty La., Placentia, Calif. 92670

[21] Appl. No.: 66,861

[22] Filed: Jun. 25, 1987

[51] Int. Cl.⁴ ............................................. G01B 9/02
[52] U.S. Cl. ................................... 356/354; 364/525; 382/54
[58] Field of Search ........................ 356/354; 364/525; 382/54

[56] References Cited

PUBLICATIONS

Fontanella et al., *JOSAA*, Series 2, vol. 4, No. 3, pp. 438–448, 3/87.
Weigelt, "Modified Astronomical Speckle Interferometry 'Speckle Masking'", *Opt. Commun.*, vol. 21, pp. 55–59, 1977.

*Primary Examiner*—Davis L. Willis
*Assistant Examiner*—Matthew W. Koren
*Attorney, Agent, or Firm*—Anderson & Giaccherini

[57] ABSTRACT

Satellite imaging through a turbulent atmosphere is provided at better than turbulence-limited resolution using laser speckle statistics on reflections of orthogonal spatially periodic illumination patterns. The second harmonic of a covariance function of phase provides the phase difference between nearby spatial frequencies. By summing such phase differences over many spatial frequencies a spectral phase distribution of an image can be obtained. A spectral intensity distribution can be obtained using laser speckle statistic during uniform illumination of the target. The combined intensity and phase spectral distributions can be inverse Fourier transformed to obtain the desired image.

10 Claims, 2 Drawing Sheets

LASER SPECKLE IMAGING

BACKGROUND OF THE INVENTION

The present invention relates to imaging systems and methods, and, more particularly, to a system and method for imaging a remote target through a turbulent medium. An exemplary application is ground-based imaging of satellites through atmospheric turbulence.

Satellite imaging can be effected by illuminating a target satellite with a laser and detecting the reflections. Where the laser, the detector, or most commonly both, are ground based, the resolution of a satellite image is limited by the effects of atmospheric turbulence.

"Atmospheric turbulence" refers to the random time-varying non-uniformities in the refractive index of the atmosphere. The effects of atmospheric turbulence are commonly experienced as the twinkling of stars. The non-uniformities in the atmosphere's refractive index distort an otherwise disk-shaped star image so that the star appears to have points. The time-variations in these non-uniformities cause the points to change.

Where the illumination source and the detectors are both based on the ground, atmospheric turbulence distorts both the illumination beam and the reflection so that distortion is compounded. The basic effect is the same: the desired image is "smeared" relative to an image that would be obtained in the absence of turbulence.

Adaptive optics systems have been developed which work with reflected sunlight from the target to be imaged. They introduce a wavefront distortion to the light from the satellite, which light has been subject to turbulence induced distortion, and then form an image of the satellite using this light. The adaptive optics systems are designed so as to be able to sense the instantaneous nature of the turbulence induced wavefront distortion and adjust the distortion they introduce so that it exactly cancels the distortion due to turbulence. This "predetection" compensation of the wavefront before image formation and detection allows nearly diffraction-limited images to be produced.

Adaptive optics systems can be bulky and expensive. Generally, they include a wavefront distortion sensor, a large amount of high speed electronics, and a deformable mirror, which is deformed by an array of piezoelectric crystals according to computations based on sensor readings. The bulk and expense of deformable mirrors and piezoelectric arrays, as well as of the wavefront sensor and high speed electronics are avoided in approaches which use statistical post-detection processing rather than predetection processing to obtain the desired information about a satellite.

Laser correlography is one such post-processing technique which provides the power spectral density of an image using the statistics of laser speckle. "Laser speckle" describes the distribution of the laser reflection from the inherently microscopically rough surfaces of the target as measured over a very brief detection interval. Over a sufficiently brief duration, the detected distribution is characterized by a random distribution of discrete spots or "speckles". This random distribution changes over successive time periods due to very slight amounts of target orientation changes to yield a uniform distribution over a longer exposure.

While the individual laser speckle distributions resemble the target image's power spectral density no more than the smear obtained by adding the distributions, they do contain considerable high spatial frequency content which is obscured over longer exposures. By detecting and storing the individual laser speckle distributions, the successive distributions can be combined statistically without losing such information.

More particularly, the statistics of all of the individual laser speckle patterns exclude spatial frequencies which would not be represented in the ideal image of a target with finite extent. Likewise, if certain spatial frequencies are stronger in the ideal image of the target, then they will be correspondingly stronger in the statistics of the laser speckle patterns.

Laser correlography exploits these facts to determine the amplitude of all spatial frequency components of the ideal image. The power spectral density associated with a given spatial frequency of the image can be determined from the covariance of the intensities falling on a pair of detectors, the spacing of which detectors corresponds to that spatial frequency. The statistical data for the covariances can be obtained by multiple exposures and/or multiple pairs of detectors with the same separation.

Using a sufficient array of detectors, one can obtain the ideal image's complete power spectral distribution, i.e., the average of the square of the amplitude of each spatial frequency component of the ideal image. The inverse Fourier transform of the power spectral density yields the autocovariance of the ideal image.

An autocovariance of the target object is insufficient to produce an image of the object. The square root of the power spectral distribution can be used to determine an amplitude associated with each spatial frequency. However, the relative phases of the spatial frequency components are not obtained. In constructing an image, these relative phases are considered at least as important as the intensity information.

The problem with the failure of laser correlography to provide phase information has its parallel in "white light" speckle imaging systems, for example star imaging systems. (Herein, light is "white" if during an exposure time the oscillations at different optical frequencies have gone through different numbers of complete cycles.) Short exposures at the focal plane of a telescope yield star speckle patterns. The power spectral density of a star's image can be determined using white light speckle statistics, as demonstrated by A. Labeyrie in "Attainment of diffraction limited resolution in large telescopes by Fourier analyzing speckle patterns in stars images", Astron. Astrophsys. 6, 85–87 (1970). To obtain the power spectral distribution in a white light speckle imaging system, the intensities of a white light speckle distribution at each point of a focal plane are detected. The resulting distribution is Fourier transformed to yield a spatial frequency distribution. The amplitudes of the spatial frequency distribution are squared. Since the intensities are represented by complex numbers, squaring involves multiplying an intensity by its complex conjugate i.e. $C \times C^*$. Successive squared spatial frequency distributions are averaged and normalized to yield a normalized autocorrelation function of the image. The inverse Fourier transform of the autocorrelation function yields the power spectral density for the target image. Again, the phase information required to obtain the image is absent.

Subsequently, it was suggested that phase information could be inferred from a power spectral density. An approach developed by J. Fienup basically uses a process of elimination in excluding all phase distributions which would imply a negative intensity somewhere in the image, given the statistically obtained power spectral distribution. Ideally, this approach yields a phase distribution which is unique, except that it is indistinguishable from its mirror image. This phase distribution can be combined with the intensity information to yield an image.

Fienup's approach has been considered for application to the power spectral density obtained for laser imaging systems as well. While the approach is not well understood, it does sometimes allow images to be constructed in both white light and laser imaging systems. However, it is not generally satisfactory, and seems particularly sensitive to noise.

A superior methodology using the "Knox-Thompson algorithm" has been developed for white light speckle imaging systems. See J. C. Fontanella and A. Sève, Journal of the Optical Society of America, Vol. 4, No. 3, pp. 438–448 (1987). Labeyrie's method is followed to obtain an intensity distribution of spatial frequencies. A similar process is used to obtain the phases. However, instead of squaring spatial frequency amplitudes, nearby spatial frequency amplitudes are multiplied. The operation can be expressed as $C \times C'^*$, where C and C' are the amplitudes associated with two unequal but close spatial frequencies. Averaging and normalizing the resulting products of spatial frequency amplitudes yields a distribution of phase differences between the spatial frequencies components of the ideal image. For example, the phase difference between C and C' is obtained.

An absolute phase distribution can then be determined by summing phase differences. For example, the absolute phase, $\phi$, of a 5 cycles per meter spatial frequency in an arbitrary orientation can be obtained by summing the phase differences between 5 and 4 cycles per meter, 4 and 3 cycles per meter, 3 and 2 cycles per meter, 2 and 1 cycles per meter, and 1 and 0 cycles per meter. The spatial frequency distribution of the target image is then obtained in the form of $Ae^{i\phi}$ for each spatial frequency, where A is a real number determined using LaBeyrie's technique, and $\phi$ is the phase determined by offset multiplication and summing of differences, i.e., by the Knox-Thompson algorithm. This spatial frequency distribution can be inverse Fourier transformed to obtain the desired image.

The desirability of finding a Knox-Thompson analog for laser speckle imaging has been recognized. However, other than the fact that they both start with speckle distributions and yield power spectral densities, laser and white light speckle imaging methods are quite distinct. There is no step in laser correlography corresponding to the squaring of spatial frequency distributions in Labeyrie's technique. Thus, there is no step to replace the squaring process with the offset multiplication process as in the Knox-Thompson method.

The significance of this non-correspondence is that a satisfactory system and method for imaging unknown satellites using laser speckle measurements has remained elusive. What is needed is a method for obtaining from the laser speckle data the phase information which can be used independently or in combination with the intensity information such as that provided by laser correlography to construct an image of a target despite atmospheric turbulence.

SUMMARY OF THE INVENTION

The phase difference between nearby spatial frequencies of a target image can be determined by detecting laser speckle distributions reflected by a target scanned by a laser beam with a spatially periodic component. In particular, the phase of the second harmonic of the covariance function for a pair of detectors expressed relative to the phase of the periodic component of the laser beam with respect to the target is the phase difference between two spatial frequencies determined by the spacing of the detectors and the periodicity of the component of the laser beam.

A phase distribution for the target image can be constructed by summing phase differences for many pairs of detectors. The resulting phase distribution can be combined with an intensity distribution, obtained, for example, using laser correlography, to yield an image of the target.

To obtain optimal resolution in two dimensions, the target should be scanned by two patterns, which are preferably orthogonal to each other, but in any event non-parallel. Thus, a complete image can be obtained using three illumination modes: uniform illumination is used to obtain the spectral intensity distribution, and two scanning patterns are used to obtain two-dimensional resolution for the phase distribution.

In addition, to obtain phase resolution in two dimensions, a two-dimensional array of detectors should be used. This array can be sparse to minimize the number of detectors. However, imaging can be performed more quickly using a dense array in which different detector pairs with the same spacing and relative orientation reduce the number of exposures required for the statistical determination of the relative phase of the respective pair of spatial frequencies.

The detectors must be sensitive enough to detect laser reflections from the target over short enough durations that laser speckle patterns are detectable. The size of the individual detectors must be small enough that the diffraction limit associated with that size is insufficient to resolve the target.

The laser must provide sufficient illumination for the reflections by the target to be detected. The periodicity in the laser beam pattern can be provided by an interference wedge, a wedge of birefringent material in conjunction with a polarization analyzer, a transmission grating or other periodic filter placed along the laser path, or any of a number of other methods. In order to avoid phase ambiguities, the periodicity of the illumination patterns at the target should be at least twice, and preferably at least four times the target size. Scanning can be effected by holding the pattern stationary as the satellite moves through the pattern. Alternatively, the spatial pattern can be moved past the satellite.

Thus, a laser speckle imaging system and method is provided with little cost in complexity over that inherent in laser correlography. This means the deterioration imposed by atmospheric turbulence on satellite image can be overcome without using adaptive optics. Other features and advantages of the present invention are apparent from the description below with reference to the following drawings.

DESCRIPTION OF THE PREFERRED EMBODIMENT

Figure 1:
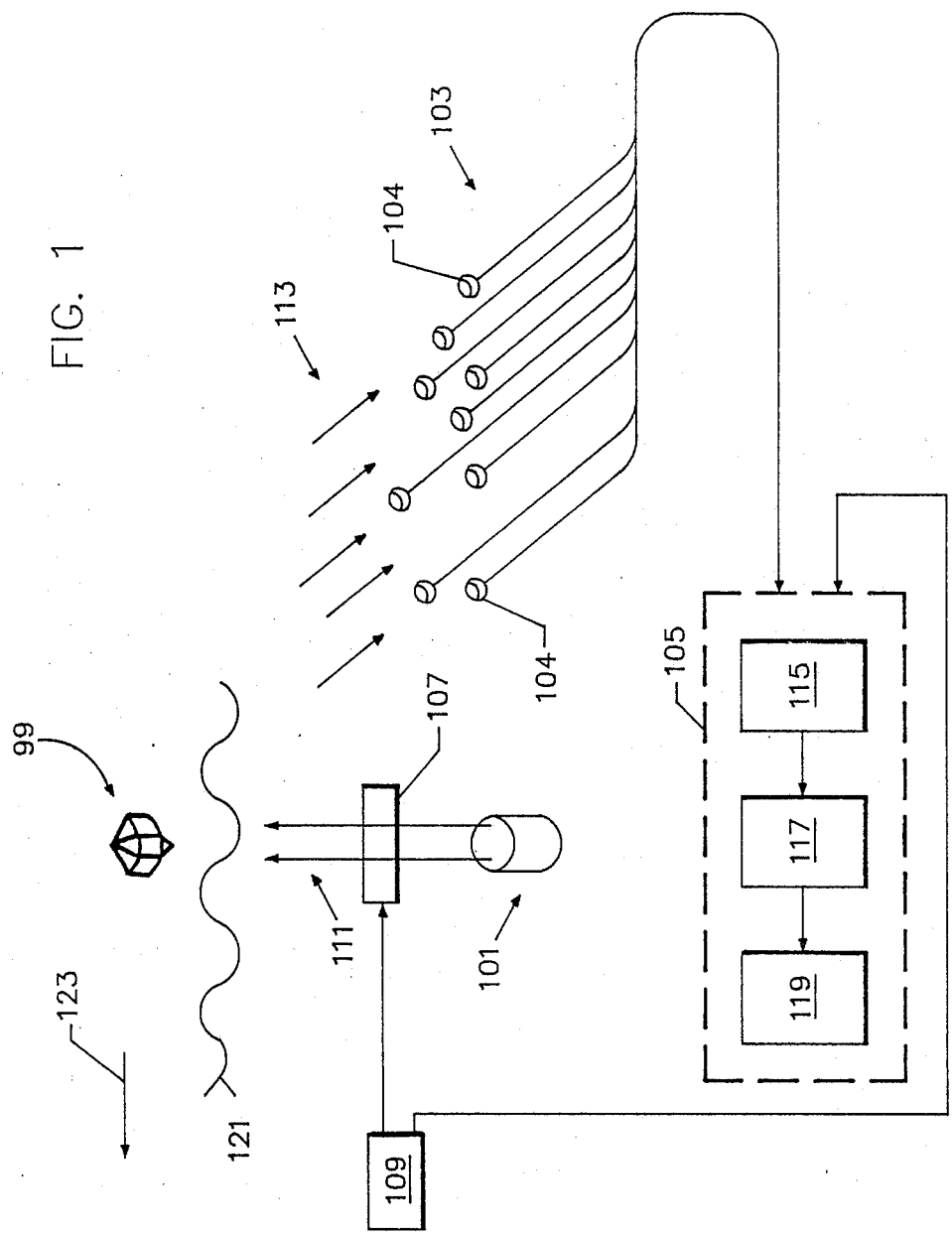
FIG. 1 is a schematic illustration of a laser speckle imaging system imaging a satellite in accordance with the present invention.

A laser speckle imaging system 100 for imaging a satellite 99 includes a laser transmitter 101, an array 103 of detectors 104 and a computer system 105. The laser transmitter includes a transmission grating 107 and a controller 109 which determines the spatial frequency pattern imposed by the shutter 107 on a laser beam 111 transmitted by the laser transmitter 101. The array 103 is arranged and designed to detect laser speckle distributions of laser reflections 113 off the satellite 99.

The computer system 105 includes a data collector 115 for collecting intensity distributions detected by the array 103. The controller 109 also provides information to the collector about the present pattern and phase of transmitted laser beam 111 so that the detector data can be correlated with the illumination pattern at the satellite 99. The illumination pattern data and the detector data are conveyed to a signal processor 117 of the computer system 105 so an image can be statistically constructed and displayed on the computer system's display 119.

The system 100 is operated in two modes. In the first mode, a uniform illumination mode in which uniform illumination is directed to the target satellite 99. The second mode, in which the satellite 99 is illuminated with spatially periodic illumination patterns, has two submodes. The sine wave illumination pattern for one of these submodes is indicated at 121. In this submode, the controller moves the pattern at the transmission grating so the pattern scans the satellite 99 in the direction indicated by arrow 123.

Figure 2:
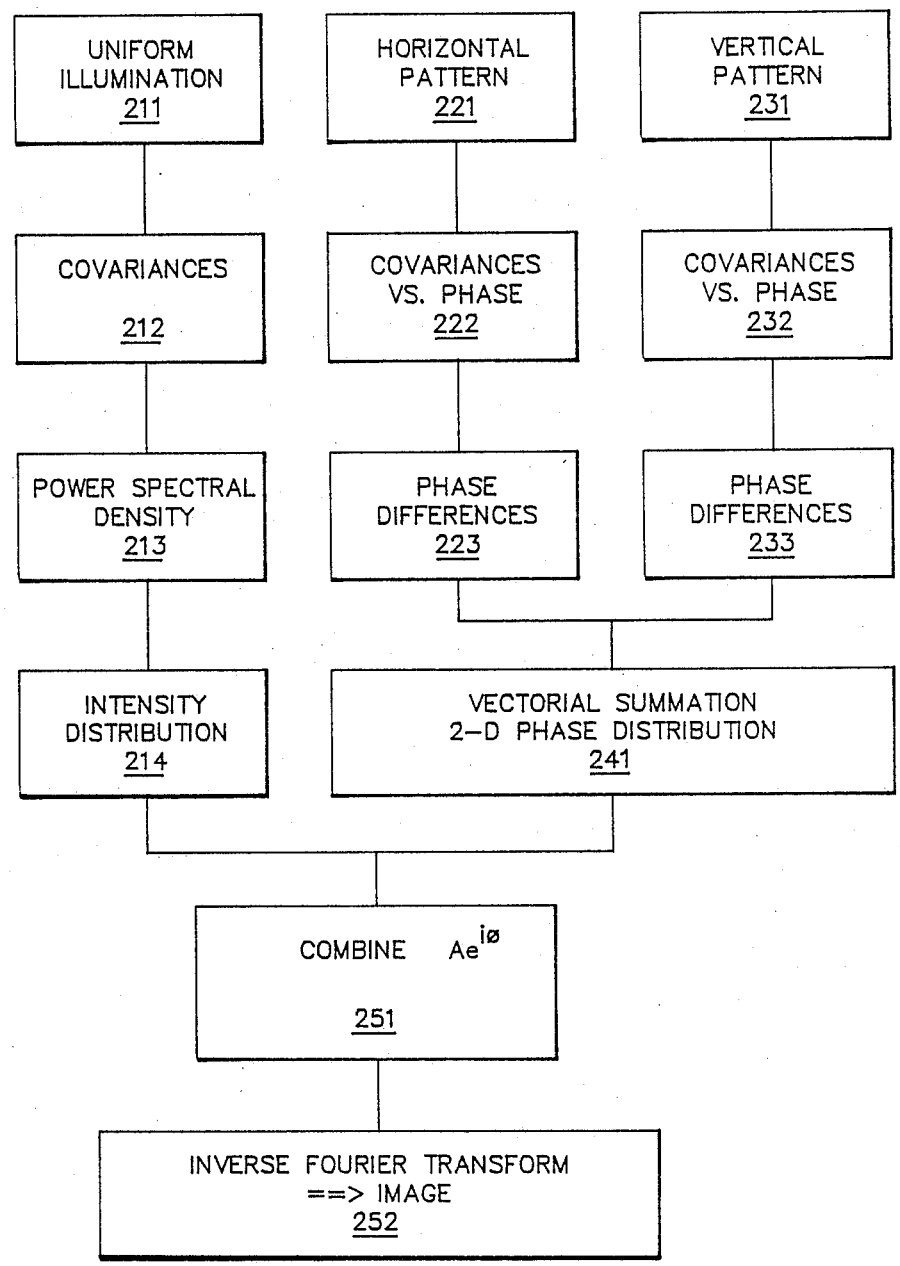
FIG. 2 is a flow chart of a method for laser speckle imaging in accordance with the present invention.

The method of the present invention is represented in the flow chart 200 of FIG. 2. The flow chart 200 includes three branches 210, 220 and 230 which converge to produce the desired image of the satellite 99. The first branch corresponds to a first mode of operation of the system 100 of FIG. 1 in which uniform laser illumination is directed at the target, as indicated at 211. The covariances of the intensities of detector pairs, calculated at 212, are used to determine the power spectral density as in laser correlography, as indicated at 213. The spectral intensity distribution is determined by taking the square root of the power spectral density as indicated at 214.

In a second mode of operation of the system 100, the target is illuminated with spatially periodic illumination. The two submodes differ essentially in the orientation of the direction of spatial periodicity. Preferably, the "horizontal" pattern in the first submode, indicated at 221, is generally orthogonal to the "vertical" pattern used in the second submode, indicated at 231.

The data collected during the first and second submodes are processed in statistically identical manners. For the one or more pairs of detectors corresponding to each spatial frequency, the covariances are plotted as a function of the phase of the illumination pattern with respect to the target, as indicated at 222 and 232. The phase of the second harmonic of this plot relative to the fundamental is used to derive the phase difference between two spatial frequencies corresponding to sum and difference spatial frequencies between the spatial frequency represented by the detector pair and the spatial frequency of the illumination, as indicated at 223 and 233.

The method of Knox-Thompson is then applied to obtain absolute phase distributions. These two sets of phase differences are combined vectorially to yield a two-dimensional phase distribution, as indicated at 241.

The intensity information obtained at 214 is combined with the phase information obtained at 241 to yield the phase and intensity distribution of the spatial frequencies, as indicated at 251. The inverse Fourier transform of this distribution is the desired image, as indicated at 252. The essential features of the system 100 and method 200 that make it possible for the satellite image to be generated are discussed below.

The laser transmitter 101 generates a series of short laser pulses. In an alternative embodiment, a continuous laser is used in conjunction with detectors having a sufficiently quick response to break up the received signal into a series of short exposures. The pulse length or exposure duration $\tau$ is short enough to satisfy the requirement that $$\tau << \frac{\lambda/D_s}{\theta}$$

where $\lambda$ denotes the laser wavelength, $D_s$ denotes the nominal size of the satellite, and $\theta$ denotes the rate of rotation of the satellite relative to the line of sight from the laser transmitter to the satellite. The laser radiation must have a long coherence length, significantly longer than the apparent depth of the target satellite, i.e., significantly longer than the difference of the distance the laser beam travels to the nearest and farthest parts of the satellite.

In the first, or "uniform", mode of laser operation, the laser beam illuminates the target satellite virtually uniformly. In the second mode of operation, the transmitter 101 projects the laser beam pattern 121 toward the satellite 99, for which the laser power density varies spatially in a sinusoidal pattern, i.e., the laser beam's power density is distributed in such a way that if a large screen were placed in front of the satellite 99, the laser irradiance falling on the screen would exhibit a sinusoidal pattern.

The period $\Lambda$ of this sinusoidal pattern 121, is significantly greater than the nominal size $D_s$ of the satellite 99. $\Lambda \approx 4 D_s$ is a reasonable setting for the period of the pattern 121.

Moreover, this sinusoidal pattern 121 is to move across the target satellite 99. The speed at which the pattern moves across the satellite 99, denoted by v, defines a period T whose value is given by the expression $T = \Lambda/v$. The only constraints on the allowable values for this period are that it must be significantly shorter than the period in which the satellite's orientation might change enough that the nature of the image would be significantly altered. As a practical matter, the period should not be so short that it is difficult for the computer 105 to coordinate the phase of the pattern 121 relative to the target 99 as indicated by the controller 107 with the data collected at the detector array 103.

In the first submode of the pattern mode, the laser transmitter 101 transmits the moving sinusoidal beam with a sinusoidal pattern oriented in a first direction. In the second submode the laser transmitter 101 transmits a second pattern, similar to the first but rotated 90°.

Two things should be noted about the motion of the sinusoidal pattern 121. First, the motion 123 is along the axis on which the sinusoid is defined, since motion perpendicular to this has no effect on the apparent position of the sinusoidal pattern. Second, the motion is defined relative to the moving satellite. This makes it possible for the transmitter 101 to project a stationary pattern: the two submodes can be achieved with the first pattern oriented at +45° to the satellite's velocity vector, and the second pattern oriented at −45° to the velocity vector.

In operation, the laser transmitter 101 sends out some number of laser pulses in the uniform mode and then in each of the submodes of the pattern mode. During all this time, the detectors 104 measure the strength of the backscattered laser pattern associated with the instant when the laser light was scattered by the satellite. The phase is defined relative to the centroid of the satellite 99, or relative to any conveniently defined point on the target.

The individual detectors 104 are sized so they each collect light over a region whose largest dimension, L, is small enough to satisfy the relationship that $L << R\lambda/D_s$, where R is the range to the target satellite. Each detector's speed of response is significantly shorter than the laser pulse-to-pulse interval. In the case of a laser pulse that is longer than $\tau$ or a continuous laser, the detector's speed of response must be shorter than $\tau$. The detectors are sensitive enough to measure accurately the laser signals they collect, and preferably, are photodetection event shot noise limited.

The invention described here requires a large number of detectors 104 for the array 103. The detectors 104 are arranged so that, for each vector r, where $|r| \leq S$, there is at least one pair of detectors 104 which has a separation vector $r \pm L\epsilon$, where S is the nominal span of the detector array 103, where $\epsilon$ is some vector which has a magnitude of one half or less, and L is defined as above. This results in an angular resolution of the image produced by the system of $\lambda/S$. It should be noted that a tightly packed array of detectors filling a circle of diameter S satisfies this criterion for the detector array pattern. However, there are quite sparsely packed arrays of detectors which also satisfy this criterion and which require a much smaller number of detectors.

The signals generated by the detectors 104 and the controller 109 are passed to the data collector 115 and then to the signal processor 117. In the signal processor, the covariance of the measured laser signals are computed for all detector pair separations. For data taken in the uniform mode, all data for each separation is combined in the averaging process used to generate the covariance.

For the pattern mode of illumination, i.e., when the illumination pattern represents a moving sinusoid, the totality of the data is grouped according to a series of time slices, corresponding to the different phases of the motion of the sinusoidal pattern across the target. For each time slice, the covariance function of the laser speckle intensity is calculated for all separations of the various detector pairs. For each separation, the value of the covariance function is extracted from the several time slice sets of covariances.

When these values of the covariance are arranged as a function of the phase of the time slice, the sequence is analyzed to extract a time dependence varying as the second harmonic of the sinusoidal modulation frequency of the laser illumination. This second harmonic component has a phase shift which is a function of the corresponding detector separation and the submode of operation, and is also a function of the target's image.

From the covariance magnitude in the first mode, and the phase shifts measured in the second mode, the target image can be calculated. This is accomplished by associating with each separation, r, an image spatial frequency $\kappa$, where $\kappa = r/\lambda$, with $\kappa$ being measured in units of cycles per radian of field-of-view. In addition, spatial frequency differences are defined:

$$\Delta_x \kappa \equiv (\lambda/R, 0) \text{ and } \Delta_y \kappa \equiv (0, \lambda/R).$$

Upon the Fourier transformation of the target image, the component $a(\kappa)$ for spatial frequency $\kappa$, has a magnitude given by $|a(\kappa)| = [C(\lambda\kappa)]^{\frac{1}{2}}$, where C(r) is the covariance function for a pair of detectors with separation r, calculated from the uniform mode data.

The phase of $a(\kappa)$ is calculated indirectly. The phase shifts calculated from the covariance function data can be shown to represent the difference between the phases of two image components. Considering first the "horizontal" or "x-axis" submode, for a detector separation r, where spatial frequency $\kappa = r/\lambda$, the calculated phase $\delta_x \phi(\kappa)$ represents the difference between the phases of the two image components $a(\kappa + \Delta_x \kappa)$ and $a(\kappa - \Delta_x \kappa)$. Likewise, for the "vertical" or "y-axis" submode, the calculated phase $\delta_y \phi(\kappa)$ can be shown to represent the difference between the phases of the two image components $a(\kappa + \Delta_y \lambda)$ and $a(\kappa - \Delta_y \kappa)$.

With the array of $\delta_x \phi(\kappa)$ and $\delta_y \phi(\kappa)$ data so obtained covering all values of $\kappa$ of interest, it is then a straightforward matter to determine the phase, $\phi(\kappa)$, for $a(\kappa)$, for all $\kappa$. This is accomplished using standard least square methods, just as applied to wavefront reconstruction in existing adaptive optics systems. With knowledge of the magnitude, $|a(\kappa)|$, and of the phase, $\phi(\kappa)$, we may consider $a(\kappa)$ known since, $$a(\kappa) = |a(\kappa)| \exp\{i\phi(\kappa)\}.$$

The array of $a(\kappa)$ values is then inverse Fourier transformed, yielding the target image. This recovered image is then passed to the image display unit for presentation to the user.

The present invention provides for many alternatives to the foregoing embodiments. The uniform and pattern modes and submodes can be successive, or they can be multiplexed in a number of ways. For example, three lasers operating at different frequencies can be used so all modes and submodes can be concurrent. Separate detectors can be used for each frequency, and concurrent processing of all data can be effected. Using a single frequency laser source, the constant and variable components of a periodic signal can be separated mathematically to obtain both the intensity distribution and one dimension of a phase distribution for the desired image. Mathematically more complex analysis can permit all three modes where the two orthogonal patterns are scanned at different rates.

The laser transmitter must be powerful enough for the laser speckle distributions of the reflections to be detected. One way to isolate laser speckle distribution is to operate the laser in pulsed mode. Alternatively, continuous mode can be used where detector response time is sufficiently rapid. Where the bandwidth of the laser source is too wide to provide optimal imaging, the laser transmitter can include a spectral filter and/or other beam conditioning means to narrow the beam bandwidth.

The periodic patterns can be isolated sine waves. Alternatively, they can be superimposed on other spatial frequency patterns, which then are optically, electrically or mathematically filtered on the receiving end of the imaging system. The patterns themselves can be imposed on the laser beam in several ways, including use of an analog or digital transmission grating optical gratings, variably silvered mirrors, polarization optics, interference arrangement, etc.

The scanning can be provided by the motion of the satellite or of the pattern in transmission grating or mechanical motion of a grating. For example, a radial grating offset from the center of a laser beam can be rotated to cause relative movement of a spatially periodic pattern with respect to the target.

The detector array can be densely or sparsely packed. Sparse packing minimizes the number of detectors required to generate an image, while dense packing can shorten the time required to gather sufficient statistical data to generate the image. Where only one dimension needs to be resolved, the array can be linear; in most cases, a two-dimensional array is preferred.

The individual detectors must be small enough that if there were diffraction limited imagers they would not be able to resolve the target themselves. They must be sensitive enough that collectively they can determine the laser speckle distribution reflected by the target. If the laser is operated continuously, the detectors should be quick enough to isolate successive laser speckle patterns.

Due to the limited illumination reaching each detector, it can be advantageous to provide optics for increasing the amount of light available for detection. A large primary optics collector telescope can be used to gather the reflected light and to direct it to the detector array in such a manner that each detector receives only the light collected by one part of the primary optics. A field stop, e.g., pinhole, between the telescope and the detector array can be used so that each detector element receives only that part of the light that comes from the direction defined by the field stop. Alternatively, each detector can have its own optical collector which converges the reflected light it intercepts onto the detector.

Many computer systems can be incorporated by the present invention. Preferably the computer is fast enough that the statistical operations permit near realtime imaging. Various storage, display and hardcopy output options can be selected according to the application. These and other modifications and variations on the illustrated embodiments are provided for by the present invention, the scope of which is limited only by the following claims.

What is claimed is:

1. A system comprising:
   detector means for determining at least one spatial frequency component of an incident laser speckle distribution, said detector means including at least a first detector and a second detector;
   scanning means for scanning a target with a first laser illumination pattern with a spatially periodic component in a first direction so as to produce reflections which in turn yield laser speckle distributions at said detector means; and
   statistical means for determining the phase difference between at least two spatial frequency components of the image of said target from a series of distributions determined by said detector means.

2. The system of claim 1 wherein:
   said detector means includes a two-dimensional array of detectors defining a two-dimensional set of spatial frequency components;
   said scanning means includes means for illuminating said target with a second laser illumination pattern with a spatially periodic component in a second direction non-parallel to said first direction; and
   said statistical means can determine the two-dimensional phase distribution of the image of said target using determinations made during scanning of said target by said first and second illumination patterns.

3. The system of claim 2 wherein:
   said scanning means includes means for illuminating said target uniformly; and
   said statistical means can determine the intensity distribution of the image of said target using laser speckle determinations during uniform illumination of said target so that an image of said target can be composed by combining information embodied in said intensity and phase distributions of said target.

4. The system of claim 1 wherein said spatial periodicity at said target is at least twice the greatest dimension of said target.

5. The system of claim 1 wherein said statistical means includes means for determining the phase of the second harmonic of the covariance function of the intensities taken over a series of laser speckle distributions by said first and second detectors, said covariance function having the phase of said first pattern relative to said target as an independent variable.

6. A method comprising:
   scanning a target with a laser illumination pattern including a first spatially periodic component;
   detecting at least one spatial frequency component of laser speckle distributions of the reflection of said laser illumination pattern by said target using at least a first pair of spaced detectors so that plural detections are made for each of multiple phases of said pattern relative to said target; and
   from the detections, statistically determining the phase difference between two spatial frequencies.

7. The method of claim 6 wherein said statistical step involves determining the covariance of the intensities detected by said first pair of spaced detectors as a function of the phase of said target relative to said pattern, the second harmonic of said function representing the phase difference between a first spatial frequency which is a function of the difference between the spacing of said first pair of spaced detectors.

8. The method of claim 6 further comprising a second scanning step of scanning said target with a second laser illumination pattern including a second spatially periodic component non-parallel to said first spatially periodic component, and wherein said detecting step involves detecting laser speckle distributions using a two-dimensional array of detectors so that said statistical step yields a two-dimensional phase distribution representing an image of said target.

9. The method of claim 8 further comprising a step of uniformly illuminating said target and wherein said statistical step involves determining the intensity distribution of the image of said target, said statistical step further including a substep of combining said intensity distribution with said two-dimensional phase distribution to obtain an image of said target.

10. The method of claim 6 wherein said first spatially periodic component has a spatial period greater than twice the greatest dimension of said target.

* * * * *